United States Patent
Kim et al.

(10) Patent No.: US 11,599,928 B2
(45) Date of Patent: Mar. 7, 2023

(54) REFRIGERATOR AND METHOD FOR MANAGING PRODUCTS IN REFRIGERATOR

(71) Applicant: LG ELECTRONICS INC., Seoul (KR)

(72) Inventors: Jinok Kim, Seoul (KR); Sungmok Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 644 days.

(21) Appl. No.: 16/487,644

(22) PCT Filed: Apr. 10, 2019

(86) PCT No.: PCT/KR2019/004304
§ 371 (c)(1),
(2) Date: Aug. 21, 2019

(87) PCT Pub. No.: WO2019/135670
PCT Pub. Date: Jul. 11, 2019

(65) Prior Publication Data
US 2020/0327601 A1    Oct. 15, 2020

(51) Int. Cl.
*G06Q 30/06* (2012.01)
*G06F 3/0488* (2022.01)
(Continued)

(52) U.S. Cl.
CPC ....... *G06Q 30/0631* (2013.01); *G06F 3/0488* (2013.01); *G06K 9/6267* (2013.01);
(Continued)

(58) Field of Classification Search
None
See application file for complete search history.

(56) References Cited

U.S. PATENT DOCUMENTS

| | | | |
|---|---|---|---|
| 9,195,960 B2 * | 11/2015 | Kim | G06Q 10/087 |
| 9,965,798 B1 * | 5/2018 | Vaananen | F25D 27/005 |
| 10,552,890 B2 * | 2/2020 | Lee | G06F 3/04817 |
| 2013/0067375 A1 * | 3/2013 | Kim | G06F 3/04842 |
| | | | 715/769 |

(Continued)

FOREIGN PATENT DOCUMENTS

| | | | |
|---|---|---|---|
| CN | 107850384 A * | 3/2018 | F25D 29/00 |
| JP | 2016-145703 | 8/2016 | |

(Continued)

OTHER PUBLICATIONS

International Search Report dated Jan. 10, 2020 issued in International Application No. PCT/KR2019/004304.

*Primary Examiner* — Henry Orr
(74) *Attorney, Agent, or Firm* — KED & Associates LLP

(57) ABSTRACT

A method for managing products in a refrigerator comprises the steps of: registering user information including a face image, in association with at least one vendor; after a refrigerator door is opened, photographing an external area around the refrigerator and then recognizing a user's face; while the door is closed after the opening of the refrigerator door, photographing the inside of a storage chamber of the refrigerator and processing the captured image to acquire product information of a product taken; storing the acquired product information of the taken product as a product use history, in association with the recognized user's face; and when receiving a user input, displaying a purchase recommendation product list per user with information of an associated vendor on the basis of the product use history. In an embodiment of the present invention, a refrigerator to which an IOT is applied may be provided.

19 Claims, 16 Drawing Sheets

(51) Int. Cl.
*G06F 3/04817* (2022.01)
*G06F 3/0482* (2013.01)
*G06K 9/62* (2022.01)
*H04N 5/225* (2006.01)
*H04N 5/232* (2006.01)
*H04N 5/247* (2006.01)
*G06V 10/40* (2022.01)
*G06V 20/00* (2022.01)
*G06V 40/50* (2022.01)
*G06V 40/16* (2022.01)
*G06Q 30/0601* (2023.01)

(52) U.S. Cl.
CPC .............. *G06V 10/40* (2022.01); *G06V 20/00* (2022.01); *G06V 40/166* (2022.01); *G06V 40/172* (2022.01); *G06V 40/50* (2022.01); *H04N 5/2253* (2013.01); *H04N 5/23203* (2013.01); *H04N 5/247* (2013.01); *G06F 3/0482* (2013.01); *G06F 3/04817* (2013.01)

(56) References Cited

U.S. PATENT DOCUMENTS

| | | | |
|---|---|---|---|
| 2015/0228253 A1* | 8/2015 | Lee | G06V 20/20 |
| | | | 345/592 |
| 2016/0057394 A1 | 2/2016 | Marutani et al. | |
| 2016/0162715 A1* | 6/2016 | Luk | F25D 29/00 |
| | | | 235/385 |
| 2016/0223249 A1 | 8/2016 | Nishimura et al. | |
| 2017/0061521 A1 | 3/2017 | Lee et al. | |
| 2017/0219276 A1* | 8/2017 | Wang | G06V 10/454 |
| 2018/0053440 A1* | 2/2018 | Staveley | G09B 19/0092 |
| 2018/0335252 A1 | 11/2018 | Oh | |
| 2020/0088463 A1* | 3/2020 | Jeong | G06F 3/167 |
| 2020/0219606 A1* | 7/2020 | Koh | G06Q 30/0631 |

FOREIGN PATENT DOCUMENTS

| | | |
|---|---|---|
| KR | 10-2017-0027565 | 3/2017 |
| KR | 10-2018-0124193 | 11/2018 |
| KR | 10-2018-0126859 | 11/2018 |

* cited by examiner

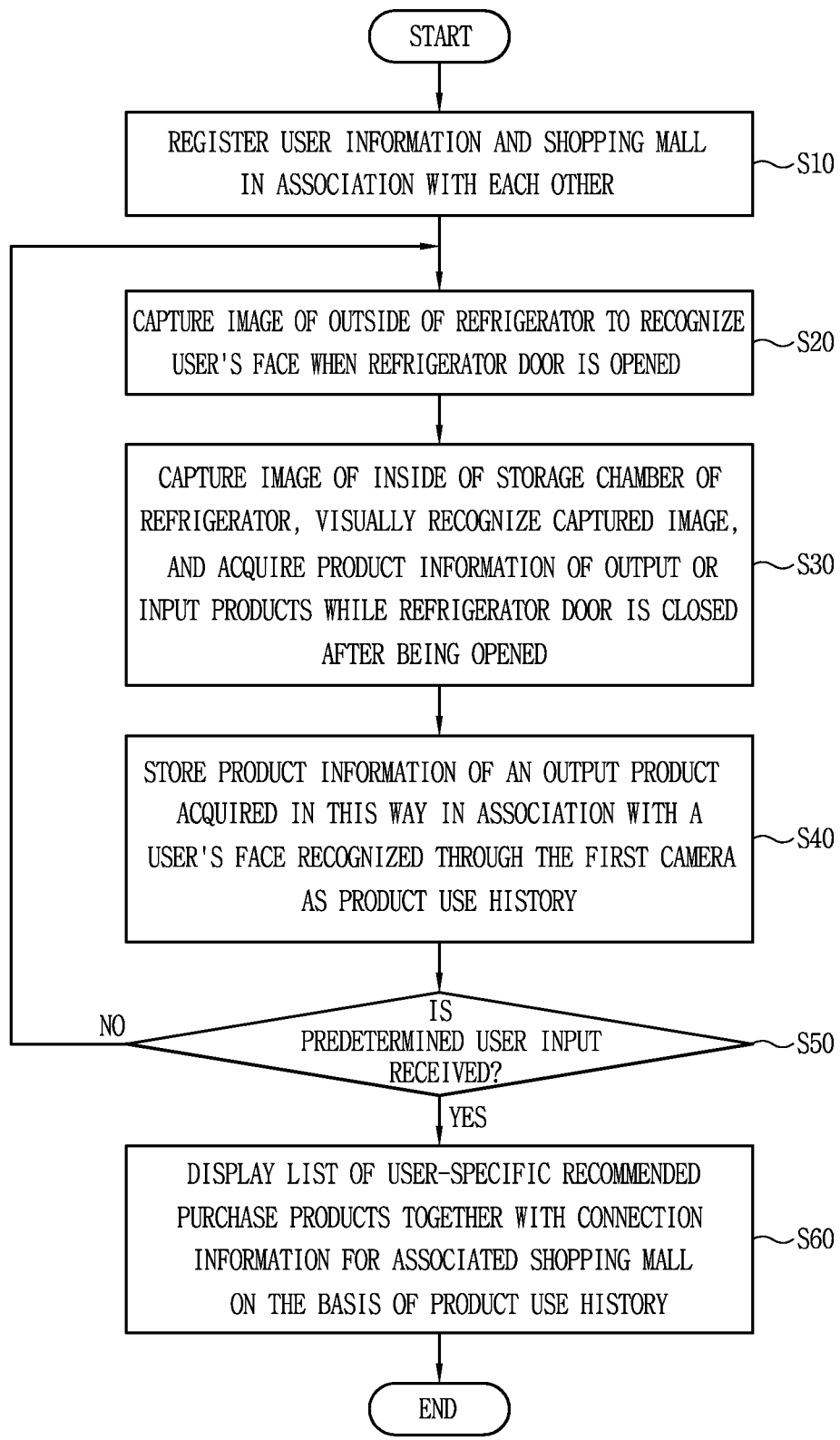

REFRIGERATOR AND METHOD FOR MANAGING PRODUCTS IN REFRIGERATOR

CROSS-REFERENCE TO RELATED PATENT APPLICATIONS

This application is a U.S. National Stage Application under 35 U.S.C. § 371 of PCT Application No. PCT/KR2019/004304, filed Apr. 10, 2019, whose entire disclosure is hereby incorporated by reference.

TECHNICAL FIELD

The present invention relates to a refrigerator and a method for managing products in the refrigerator.

BACKGROUND ART

A refrigerator is an apparatus for discharging cold air generated by a freezing cycle composed of a compressor, a condenser, an expansion valve, an evaporator, etc. to lower the temperature in the refrigerator so that foods or the like may be refrigerated or frozen.

When the door of a refrigerator is made opaque, a user cannot check foods stored in the inside of the refrigerator without opening the door of the refrigerator.

In order to overcome such an inconvenience, there is an example in which a refrigerator is implemented to have a door partially changed to be transparent so that foods stored in the inside of the refrigerator can be checked when a predetermined input is received. However, according to this method, it is difficult to check foods stored at the back side.

Also, in order to check stored foods through radio frequency identification (RFID) tags or the like, an RFID tag should be attached to each stored food.

Meanwhile, in order to manage user preferences for foods stored in a refrigerator even after the foods are checked, a user should enter preferred food names or collectively classify the preferences according to a predetermined criterion (e.g., adult, kid, etc.).

Thus, the history of the foods stored in the refrigerator cannot be efficiently managed, and thus the usability is degraded.

DISCLOSURE

Technical Problem

One object of the present invention is to provide a refrigerator capable of accurately managing user preference on the basis of a product being output from the refrigerator, and a method of managing products in the refrigerator.

Also, another object of the present invention is to provide a refrigerator capable of managing a user-specific use history by recognizing a user when a product is output from the refrigerator, and a method of managing products in the refrigerator.

Also, still another object of the present invention is to provide a refrigerator capable of instantly recommending an online purchase product on the basis of a user-specific use history, and a method of managing products in the refrigerator.

Also, yet another object of the present invention is to provide a refrigerator capable of recommending the purchase of a specific product by checking a user history of a user approaching the refrigerator, and a method of managing products in the refrigerator.

Technical Solution

A refrigerator according to an embodiment of the present invention includes a storage chamber configured to store a product; a camera configured to capture images of the outside and the inside of the storage chamber; a memory configured to store user information including a face image and one or more shopping malls in association with each other; a control unit configured to visually recognize user information matched to a face image captured through the camera and a product image captured through the camera to acquire product information of an output product while a refrigerator door is opened or closed; and a display electrically connected to the control unit, wherein the control unit may detect the opening or closing of the refrigerator door, store the acquired product information of the output product and the matched user information in association with each other as a product use history, and the control unit may perform control such that a list of user-specific recommended purchase products based on the product use history is displayed on the display together with connection information of an associated shopping mall in response to receiving a predetermined unit input.

Also, according to an embodiment, the refrigerator is characterized in that the camera includes a first camera for capturing an image of the outside of the storage chamber and a second camera for capturing an image of the inside of the storage chamber and the control unit analyzes a face image captured through the first camera to acquire matched user information and visually recognizes a product image captured through the second camera to acquire product information of an output product.

Also, according to an embodiment, the refrigerator is characterized in that when the opening of the refrigerator door is detected, the control unit captures a face image through the first camera to detect a face region and analyzes data of the detected face region on the basis of a model learned according to an artificial intelligence algorithm to classify a user.

Also, according to an embodiment, the refrigerator is characterized in that when the opening of the refrigerator door is detected, the control unit extracts feature points from the product image captured through the second camera and performs visual recognition on the basis of the extracted feature points to classify the class of the output product.

Also, according to an embodiment, the refrigerator is characterized in that when a first input is received, the control unit detects entry into a user information registration mode and displays first screen information for selecting a face image to be registered as user information through network communication and in that when a second input for selecting the face image to be registered using the first screen information is received, the control unit controls the display such that second screen information for selecting a shopping mall to be associated with the selected face image is displayed.

Also, according to an embodiment, the refrigerator is characterized in that the first camera is located on an inner side with respect to the refrigerator door and the control unit outputs a capture command for capturing a face image of the user in response to detecting that a hinge unit provided on one side of the refrigerator door is rotated over a certain range after the door is opened.

Also, according to an embodiment, the refrigerator is characterized in that the first camera is located on an outer side with respect to the refrigerator door and the control unit outputs a capture command for capturing a face image of the user in response to detecting that the user approaches the refrigerator door and receiving a door opening signal.

Also, according to an embodiment, the refrigerator is characterized in that when a touch input is applied to the display, the control unit outputs identification information of the user recognized on the basis of the face image acquired through the first camera and then outputs a graphic object for providing a recommended purchase product to the display in response to the output of the identification information.

Also, according to an embodiment, the refrigerator is characterized in that in response to a touch input applied to the graphic object, the control unit displays a list of recommended purchase products corresponding to a product use history of the recognized user and displays an "add to cart" icon for each product in the list as the connection information of the associated shopping mall.

Also, according to an embodiment, the refrigerator is characterized in that when a touch input is applied to the "add to cart" icon, the control unit executes an "add to cart" function for a corresponding recommended purchase product and outputs a purchase icon for paying for the corresponding recommended purchase product to the display.

Also, according to an embodiment, the refrigerator is characterized in that the list of the recommended purchase products is sorted in sequence on the basis of a product use frequency corresponding to a product use history of a corresponding user.

Also, according to an embodiment, the refrigerator is characterized in that at least some of food information, expiration date information, and output time information of the output product acquired through the visual recognition are included in the list of the recommended purchase products.

Also, according to an embodiment, the refrigerator is characterized by further including a sensor configured to detect user proximity, wherein in response to detecting proximity of a user, the control unit captures a face image of the user through the camera and outputs notification information for encouraging a product purchase on the basis of a product use history of the user matched to the captured face image.

Also, according to an embodiment, the refrigerator is characterized in that while a list of recommended purchase products for a first user is displayed, the control unit controls the display such that a recommended purchase product for a second user selected based on a touch input applied to the display is added to and provided along with the list.

Also, a method of managing products in a refrigerator includes registering user information including a face image, in association with one or more shopping malls; capturing an image of the outside of the refrigerator through a first camera after a refrigerator door is opened and then recognizing a user's face; capturing an image of the inside of a storage chamber of the refrigerator through a second camera while the refrigerator door is closed after the refrigerator is opened and then visually recognizing the captured image to acquire product information of an output or input product; storing the acquired product information of the output product as a product use history, in association with the recognized user's face; and displaying a user-specific purchase recommendation product list together with information of an associated shopping mall on the basis of the product use history when a predetermined user input is received.

Advantageous Effect

According to an embodiment of the present invention, by capturing images of a user's face and an output product when the product is output from a refrigerator, it is possible to accurately manage the history of the output product on a user basis. Also, by pre-associating user information matched to a user's face with a favorite shopping mall when the user information is registered, it is possible to recommend a purchase product and instantly purchase the recommended product on the basis of a user-specific product use history. Accordingly, the usability of the management and purchase of favorite products for each user may be further improved. Furthermore, by checking a use history of a user approaching a refrigerator when the user is recognized and outputting notification information for encouraging the purchase of a product necessary to be purchased, the user does not miss the product necessary to be purchased, and thus it is possible to improve the user's purchasing power.

BRIEF DESCRIPTION OF THE DRAWINGS

FIG. 3 is a representative flowchart illustrating a refrigerator product management method according to an embodiment of the present invention.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
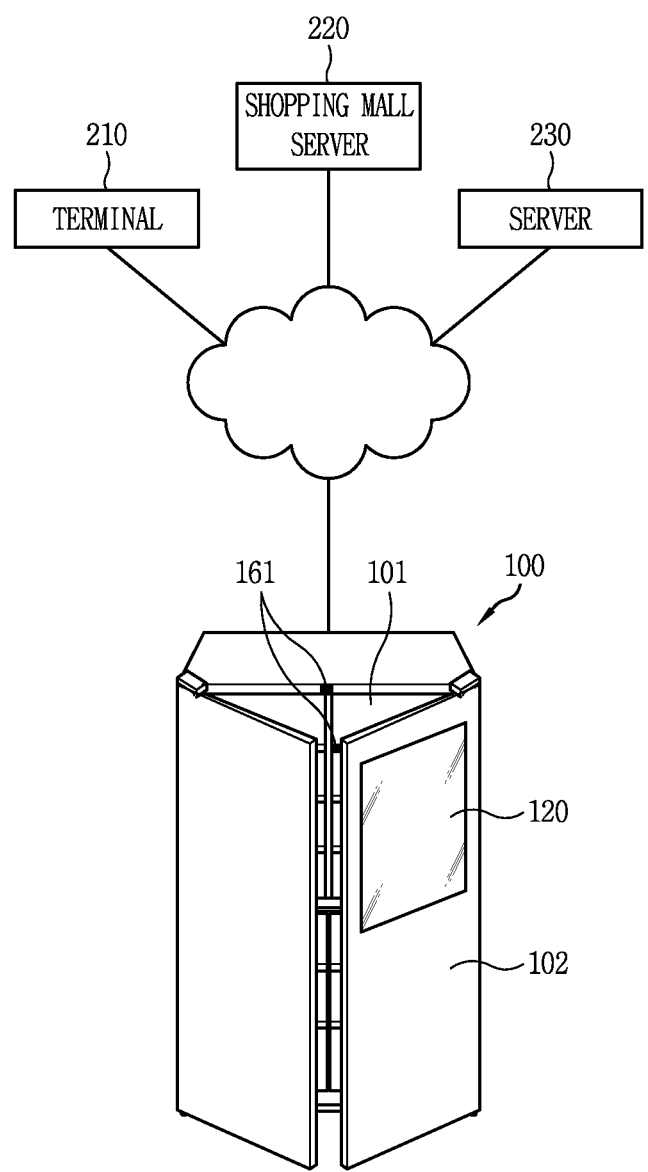
FIG. 1 is a schematic diagram illustrating that a refrigerator communicates with an external device such as a terminal, a server, and a shopping mall server according to an embodiment of the present invention.

FIG. 1 is a schematic diagram illustrating that a refrigerator communicates with an external device such as a terminal, a server, and a shopping mall server according to an embodiment of the present invention.

Referring to FIG. 1, a refrigerator 100 according to the present invention may communicate with an external terminal 210, a shopping mall server 220, and/or another server 230 over a network or the like. A display 120 for outputting information may be provided at least one or both sides of a door 102 of the main body of the refrigerator according to the present invention.

The shopping mall server 220 may communicate with the refrigerator 100 directly or via the terminal 210.

Also, the server 230 may be an artificial intelligence server that visually recognizes an image acquired by the refrigerator 100.

A touchpad is built in the display 120, and the display 120 may receive a touch input from a user. A process provided in the refrigerator 100 and electrically connected to the display 120 may output a control command corresponding to a touch input received through the display 120. Then, the display 120 displays information corresponding to a control command delivered through the processor.

A storage chamber 101 for storing foods or the like is provided inside the main body of the refrigerator. The storage chamber 101 may be divided into a refrigeration chamber and a freezing chamber, each of which may include a plurality of storage rooms. Also, the plurality of storage rooms may be formed as independent spaces through partitioning by barriers or the like.

One or more cameras 161 for capturing an image of the inside of the storage chamber 101 may be provided inside the storage chamber 101.

As shown in FIG. 1, the cameras 161 may be provided at a first point where both doors meet to capture an image of a user approaching the refrigerator or the like. Also, as shown in FIG. 1, the one or more cameras 161 may be provided in a plurality of storage rooms in the refrigerator. In this case, a flash or the like may be additionally disposed at a position adjacent to the camera. For example, the flash provides light to the inside of the storage chamber when the camera 161 captures an image of a product being input into or output from the refrigerator or a product being stored.

Images of products stored in the storage chamber, which are captured through the camera 161, may be displayed on the display 120.

Also, the processor (not shown) of the refrigerator may deliver the captured product image or the displayed product image to any one of the external terminal 210, the shopping mall server 220, and/or the server 230 through a communication module (not shown).

In this case, the server 230 or the terminal in communication with the refrigerator may visually recognize the product image using an artificial intelligence module. The artificial intelligence module processes information based on artificial intelligence technology and may include one or more modules for performing at least one of information learning, information inference, information perception, and natural language processing.

An algorithm using such a machine learning technology may be a statistics-based algorithm and may include Decision Tree, which uses a tree structure form as a prediction model; Neural Network, which mimics the structure and function of a biological neural network; Genetic Programming, which is based on biological evolutionary algorithms; Clustering, which distributes an observed example to subsets called clusters; and Monte Carlo Method, which probabilistically calculates a function value through arbitrarily extracted random numbers.

As a field for a machine learning technology, a deep learning technology is a technology of performing at least one of learning, determination, and processing on information using an artificial neural network algorithm. An artificial neural network may have a structure for performing connection between layers and transferring data between layers. A deep learning technology can learn a massive amount of information through an artificial neural network using a graphic processing unit (GPU) optimized for parallel computing.

In particular, convolutional neural network (CNN) technology is a deep learning technology for visual recognition. This is a technology of applying various image understanding technologies based on deep learning, performing classification, searching, and object detection on images, and connecting the images to analysis information (or functions).

For example, as an application function using the CNN technology, a translation function is provided by analyzing text included in an image captured by a camera, or a shopping function is provided so that a product included in an image captured by a camera may be purchased online. As another example, a phone connection function is performed when a phone contact is captured through a camera, and a customized styling provision function is provided when a user is captured. Furthermore, a function of virtually creating a face at various angles by converting a face image included in an image into a 3D model through Face Recognition API or the like may be performed.

Meanwhile, when a specific operation is executed, an artificial intelligence module may analyze history information indicating the execution of the specific operation through the machine learning technology and may update previously learned information on the basis of the analysis information. Thus, the artificial intelligence module may improve information prediction accuracy.

In this specification, it may be understood that the artificial intelligence module is the same element as a processor or a control unit of the external server 230 or the external terminal 210 (or the refrigerator 100).

As another example, an artificial intelligence module (not shown) may be independently provided in the refrigerator. In this case, the visual recognition may be performed in the refrigerator without having to transmit a captured product image to the external server 230 or the terminal 210 like FIG. 1.

Figure 2:
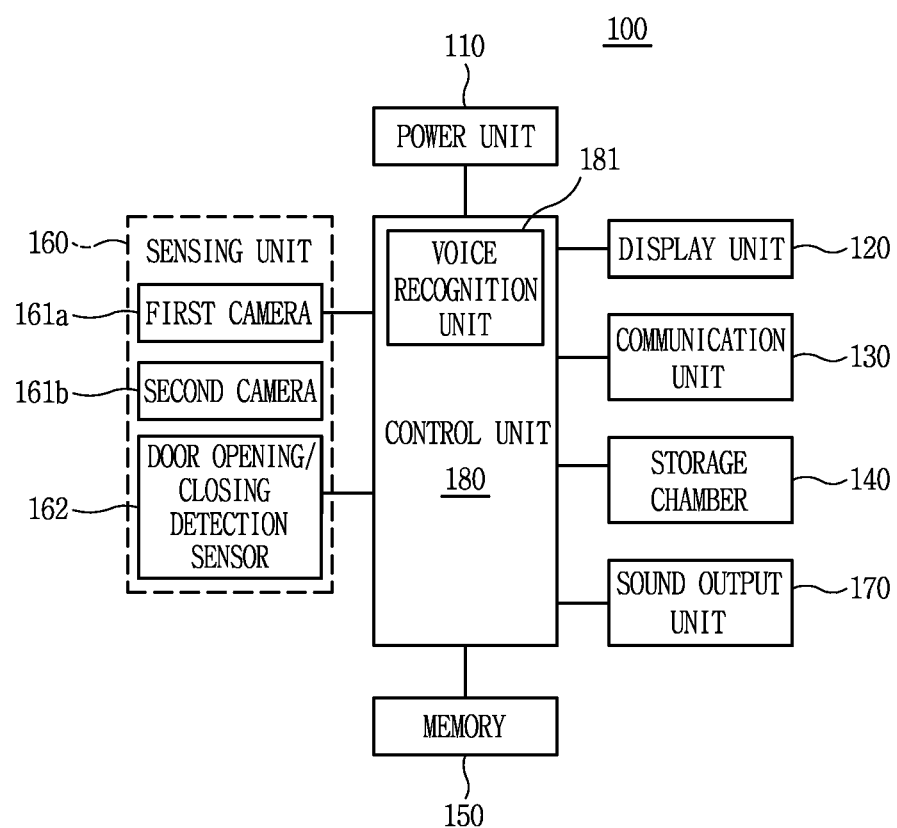
FIG. 2 is an example block diagram illustrating a configuration of a refrigerator according to an embodiment of the present invention.

FIG. 2 is an example block diagram illustrating a configuration of the refrigerator according to an embodiment of the present invention.

Referring to FIG. 2, the refrigerator 100 may include a control unit (hereinafter used interchangeably with a processor) 180 and may include a sensing unit 160, a display unit 120, a communication unit 130, a memory 150, a power unit 110, and a sound output unit 170 which are electrically connected to the control unit 180. Also, as described above, the refrigerator 100 may include a storage chamber 140 formed to store products.

Meanwhile, the elements shown in FIG. 2 are not essential for implementing the refrigerator 100, so that the refrigerator 100 described herein may have more or fewer elements than the elements listed above.

In more detail, under control of the control unit 180, the power unit 110 among the above elements may receive power from the outside and supply the power to each element included in the refrigerator 100.

Although not shown, a door provided on the front surface of the refrigerator may be formed to selectively open or close the storage chamber 140 provided inside the refrigerator 100, and a plurality of such doors may be formed.

At least one sensor may be provided in the door and formed to detect a user input. As an example, the door may form a mutual layer structure together with a touch sensor to detect a user's touch input applied to the door. Alternatively, the door may have a sound sensor to sense a user's knock input, which indicates knocking on the door.

Also, although not shown, the storage chamber 140 may include at least one light. The light may be provided in a region of each of a plurality of storage rooms of the storage chamber and may be formed to emit light depending on whether the door is opened.

The storage chamber 140 may include a storage chamber for storing foods and a compressor, a condenser, an expansion valve, an evaporator, and the like which are formed in the storage chamber to discharge cold air according to a predetermined freezing cycle. The storage chamber 140 may freeze or refrigerate the foods or the like stored in the storage chamber by lowering the temperature in the refrigerator 100 by the discharged cold air.

The display unit 120 may receive a user input and may display information corresponding to the user input, for example, a product image. The display unit 120 may include a display panel (not shown) for displaying a product image. As the display panel, a cathode ray tube (CRT) display panel, a liquid crystal display (LCD) panel, a light emitting diode (LED) panel, an organic light emitting diode (OLED) panel, a plasma display panel (PDP), a field emission display (FED) panel, or the like may be employed.

Also, the display unit 120 may receive a user's touch input, generate an electrical signal corresponding to the received touch input, and provide the generated electrical signal to a controller of the display unit. The display unit 120 may be installed on one or both sides with respect to the door, as shown in FIG. 1, for user convenience.

Meanwhile, the sensing unit 160 may include one or more sensors for sensing information regarding the inside of the refrigerator 100 and an ambient environment surrounding the refrigerator 100. For example, the sensing unit 160 may have an environmental sensor for detecting the temperature, humidity, or the like of the storage chamber 140 of the refrigerator 100 or a human body detection sensor for detecting a user near the refrigerator.

Also, the sensing unit 160 may include a door opening/closing detection sensor 162 for detecting the opening or closing of the door and a camera 161 for capturing an image of the inside of the storage chamber.

Also, according to the present invention, the sensing unit 160 may have a first camera 161a and a second camera 161b. Here, the first camera 161a may be driven as a camera for capturing an image of the outside of the storage chamber 140. Also, the second camera 161b may be driven as a camera for capturing an image of the inside of the storage chamber 140, that is, an image of a product being stored.

The camera 161a and the second camera 161b may be provided inside the refrigerator. Alternatively, any one of the first camera 161a and the second camera 161b may be provided on the inner side with respect to the door, and the other one may be provided on the outer side with respect to the door.

Also, the first camera 161a and the second camera 161b may be driven at different time points and may operate independently depending on a driving command delivered from the control unit 180.

Also, although not shown, one or more third cameras may be further provided to capture an image of the outside of the storage chamber 140 or an image of a product being stored.

Also, the sensing unit 160 may be a sensor associated with various functions of the refrigerator 100 and may include a sensor associated with an automatic door function. For example, the sensing unit 160 may include a proximity sensor capable of detecting a user proximate to the refrigerator 100. In this case, the proximity sensor may be formed to detect the body of the proximate user. Also, the control unit may control at least one of the doors of the refrigerator 100 to be opened according to the detection result by the proximity sensor (an automatic door function).

Also, the memory 150 stores data for supporting various functions of the refrigerator 100. The memory 150 may store multiple application programs or applications being driven in the refrigerator 100 and store data and commands for operation of the refrigerator 100.

At least some of the application programs may be downloaded from an external server through wireless communication. Also, at least some of the application programs may reside in the refrigerator 100 at the time of shipment to perform basic functions (e.g., a storage region-specific temperature management function) of the refrigerator 100.

Also, information regarding a product image history according to the present invention is stored in the memory 150. Also, one or more product images recorded in the product image history are stored in the memory 150.

The communication unit 130 may include one or more modules for enabling the processor of the refrigerator to communicate with an external server and/or terminal in a wireless manner. For example, the communication unit 130 may include a Wi-Fi module, a Zigbee module, and the like for accessing a local area network.

The sound output unit 170 may output a sound signal related to a function (e.g., a door opened, a product purchased, etc.) performed by the refrigerator 100. The sound output unit 170 may include a receiver, a speaker, a buzzer, and the like. For example, the sound output unit 170 may convert an electrical signal delivered from the control unit 180 into a sound signal and output the sound signal through the speaker.

The control unit 180 controls the overall operation of the refrigerator 100. The control unit 180 may provide or process information or functions appropriate to a user by processing signals, data, information, and the like which are input or output through the above elements or by driving the application programs stored in the memory 150.

Also, the control unit 180 may control at least some of the elements described with reference to FIG. 2 in order to drive the application programs stored in the memory 150. Furthermore, in order to drive the application program, the control unit 180 may operate at least two of the elements included in the refrigerator 100 in combination.

Also, the control unit 180 may control each of the connected elements. In particular, the control unit 180 may control operation of the camera 161 to capture an image of the inside of the storage chamber 140. Also, the control unit 180 may control operation of the communication unit 130 such that the product image acquired through the camera 161 is transmitted to the external server or terminal to perform visual recognition using the CNN deep learning technology or the like. Also, the control unit 180 performs control such that the captured product image and product information acquired through the visual recognition of the product image are stored to create a product image history. Also, the control unit 180 controls operation of the display 120 to perform displaying in association with product information confirmed based on the captured product image and the product image history.

Also, a voice recognition unit 181 may be provided inside the control unit 180 or independently of the control unit 180. The voice recognition unit 181 may analyze a voice received through a voice reception unit such as a microphone through a natural language processing algorithm.

Also, the voice recognition unit 181 may convert information regarding the analyzed voice into a language that can be processed by computers. As described above, when the voice recognition unit 181 is provided, the refrigerator 100 according to the present invention may perform a voice recognition function to control the operation of the refrigerator.

The term "product" used herein may include industrial products manufactured and traded by people or machines, products produced or hunted by users, and the like. Such a "product" may be stored in the refrigerator while being stored in a separate container.

A refrigerator product management method according to an embodiment of the present invention will be described in detail below with reference to FIG. 3.

Referring to FIG. 3, first, a step of registering user information including a face image in association with one or more shopping malls is performed (S10).

In detail, a user may execute a user registration mode using screen information output to a display of a refrigerator according to a predetermined input. In the user registration mode, a face image of a user to be registered may be directly captured through a camera of the refrigerator or may be retrieved by accessing an interoperable application (e.g., a gallery application, an SNS application, etc.).

In this case, a user name corresponding to the face image may be input through a user input or may be automatically numbered. Here, the user input may include various types of information such as information input through a touch input for a display unit of the refrigerator, information recognized through the user's voice, and information transmitted through an external terminal.

As described above, when identification information including the face image is input, one or more favorite shopping malls are selected as an additional step. Then, a control unit of the refrigerator registers the input identification information associated with information regarding the selected favorite shopping malls as user information. The user information is stored in a memory of the refrigerator.

Meanwhile, according to an embodiment, the execution of the user registration mode may be omitted, and the following step S20 may be performed first. In this case, the recognition and registration of a user's face in the following step S20 may be performed simultaneously or sequentially.

Subsequently, when the door of the refrigerator is opened, a process of capturing an image of the outside of the refrigerator through a first camera and recognizing a user's face (S20) may be performed.

To this end, when the opening of the door is detected through a door opening/closing detection sensor, the control unit of the refrigerator may output a signal for driving the first camera. Also, the control unit may detect a face region from the captured image and match the face region to a face image included in pre-registered user information.

When the matching result is that the face region is determined as being identical to the face image of the pre-registered user information, the control unit retrieves the user information and prepares to create or update a product use history.

When the matching result is that it is determined that the face region is not identical to the face image of the pre-registered user information, the control unit classifies a face image corresponding to the detected face region as a new user. Also, after product information of an output product that will be described below is acquired, screen information for registering the registered new user may be output to the display of the refrigerator.

Meanwhile, while the door of the refrigerator is closed after the door is opened, a process of capturing an image of the inside of the storage chamber of the refrigerator through a second camera, visually recognizing the captured image, and acquiring product information of output products is performed (S30).

To this end, while the door of the refrigerator is closed after the door is opened, the second camera captures continuous images or moving images at predetermined intervals to ascertain the optical flow of a product output from the storage chamber of the refrigerator.

As another example, an output product may be recognized by comparing a first still image captured through the second camera at a time point when the door of the refrigerator is opened to a second still image captured through the second camera at a time point when the door of the refrigerator is closed after the door is opened.

The product information of the output product may be checked by providing the captured image to an external server and performing visual recognition through the external server. Alternatively, when an image history related to a product storage history is stored in the refrigerator, product information of an output product determined by comparing a previous image to a currently captured image may be detected from the image history.

Next, the control unit of the refrigerator stores the acquired product information of the output product in association with the user's face recognized through the first camera as the product use history (S40). In other words, which user has outputs which product is stored as the product use history.

As the product use history, information such as the name of an output product, an expiration date, the number of outputs, and an output time is stored in addition to the user information.

When a product output by the same user is additionally recognized, the product use history may be updated to indicate that the corresponding product information is additionally included. For example, when a first user takes a first product out of a refrigerator and then additionally takes a second product out of the refrigerator, the product use history is updated to indicate that the first user uses the first product and the second product.

When it is recognized that the same product is repeatedly output by the same user, the product use history may be updated to indicate that the use frequency of the corresponding product information is additionally included. For example, when a first user uses a first product in a refrigerator and then uses the first product again, the product use history is updated to indicate that the first product is used twice by the first user.

After the product use history is stored in this way, the control unit of the refrigerator detects reception of a predetermined user input (S50). Here, the predetermined user input includes a predetermined touch input applied through the display of the refrigerator, a predetermined user motion sensed through a sensor, a predetermined voice command, and the like.

When the predetermined user input is applied, a list of user-specific recommended purchase products created based on the product use history is displayed on the display together with connection information for an associated shopping mall (S60).

In this case, a list of recommended purchase products may provide recommended products for each user on the basis of product use history for all users.

As another example, the control unit of the refrigerator may recognize a user who applied the predetermined user input and selectively provide recommended purchase products for the recognized user. To this end, the control unit of the refrigerator may analyze the user's voice or the user's face captured upon the user input and may call only a product use history matched to registered user information.

The control unit may additionally provide a cart icon as the connection information for the shopping mall when the list of the user-specific recommended purchase products is displayed. The user may immediately add some of the displayed recommended purchase products to a desired shopping cart just by touching the provided cart icon. In this case, it should be noted that even though the cart icon has the same image, connections to different shopping malls are provided depending on the associated shopping mall which is set upon user registration.

As described above, according to the present invention, by capturing images of a user's face and an output product when the product is output from a refrigerator, it is possible to manage the history of the output product on a user basis. Also, on the basis of a user-specific product use history, it is possible to allow an immediate purchase using product recommendation and desired shopping malls. Thus, user convenience and purchase functionality are further improved.

A process of classifying a user and a class of an output product on the basis of a captured image when the opening of the door of the refrigerator is detected will be described in detail below with reference to FIGS. 4A and 4B.

The refrigerator according to the present invention includes the first camera configured to capture the outside of the storage chamber and the second camera configured to capture the inside of the storage chamber. The control unit of the refrigerator analyzes a face image captured through the first camera to acquire matched user information. Also, the control unit visually recognizes a product image captured through the second camera and acquires product information of the output product.

Figure 4A:
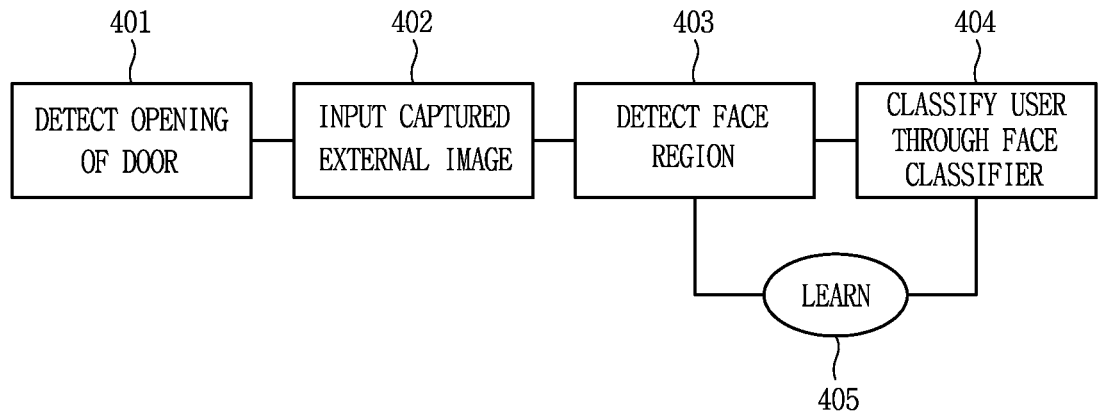
FIGS. 4A and 4B are diagrams illustrating a process of classifying a user and a class of an output product on the basis of a captured image when the opening of the door of a refrigerator is detected according to an embodiment of the present invention.

FIG. 4A shows a process of classifying a user on the basis of an image captured when the opening of the door of the refrigerator is detected.

First, when the opening of the door of the refrigerator is detected through a sensor (401), an external image captured to recognize a user is input (402). The control unit detects a face region in the external image through a face detection algorithm such as a histogram of oriented gradients (HOG) algorithm (403). Also, the control unit quantifies, i.e., embeds data regarding the detected face region into a high-dimensional vector using a model learned according to an artificial intelligence algorithm, for example, a learned deep neural network (DNN) model. The vector value is learned through, for example, a support vector machine (SVM) algorithm (S405) to create a face classifier. When the opening of the door is detected after the face classifier is created, the control unit classifies a user using the created face classifier (404).

Figure 4B:
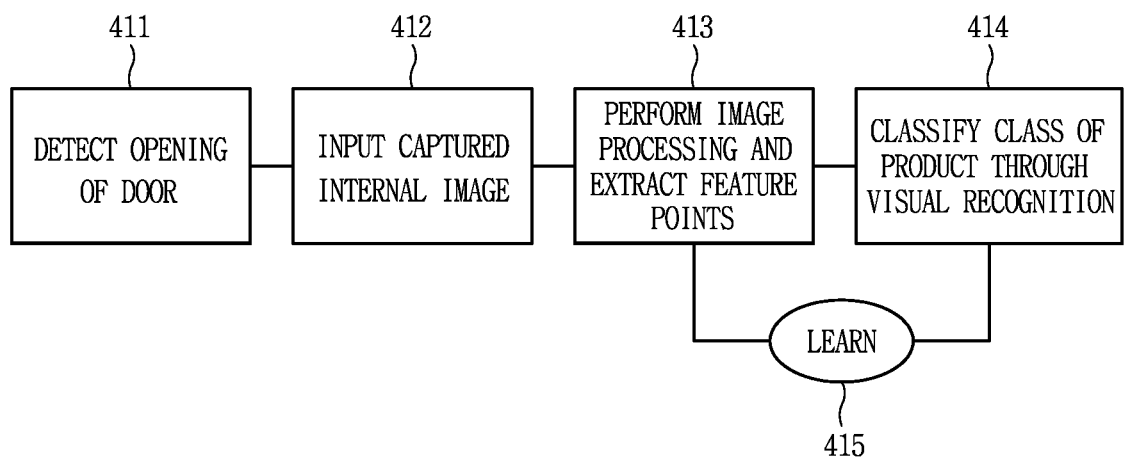

FIG. 4B shows a process of classifying a class of an output product on the basis of an output product image captured when the opening of the door of the refrigerator is detected.

First, when the opening of the door of the refrigerator is detected through a sensor (411), an internal image captured to recognize a product output from the storage chamber is input (412). The control unit performs image processing by generating a difference image between an image captured immediately when the door of the refrigerator is opened and an image captured immediately after the door of the refrigerator is closed, and then extracts feature points (413). The extracted feature points include all features of data of a database (DB) of the stored products.

Subsequently, the control unit creates a class classifier through machine learning, for example, learning based on an SVM algorithm, an Adaboost algorithm, and/or a deep learning algorithm (415). The control unit classifies a class of the output product through visual recognition using the created class classifier (414).

When the user and the class of the output product are classified, the user and the class of the output product are stored in association with each other as the product use history.

The following is an example of a user-specific product use history. Although not shown, the output time and detail information (e.g., a product name, an expiration date, information about the remaining amount, etc.) of the classified product may be additionally stored.

TABLE 1

| User | Class of Output Food |
|------|---------------------|
| Ravel | No. 3 |
| Ravel | No. 3 |
| Ravel | No. 3 |
| Ravel | No. 3 |

Figure 5A:
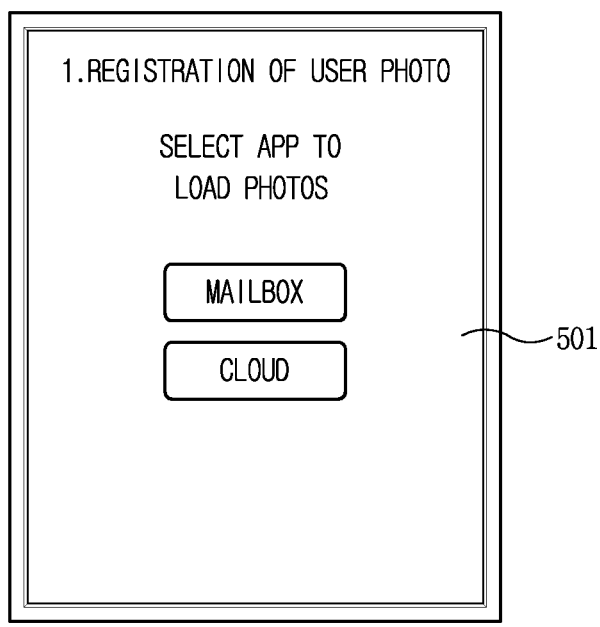
FIGS. 5A, 5B, and 5C are conceptual diagrams illustrating a process of registering user information including a face image in association with a desired shopping mall in a refrigerator according to an embodiment of the present invention.
Figure 5B:
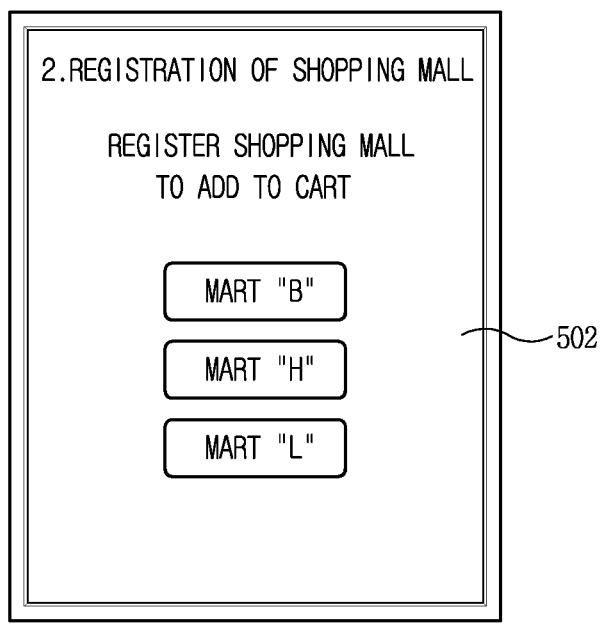
Figure 5C:
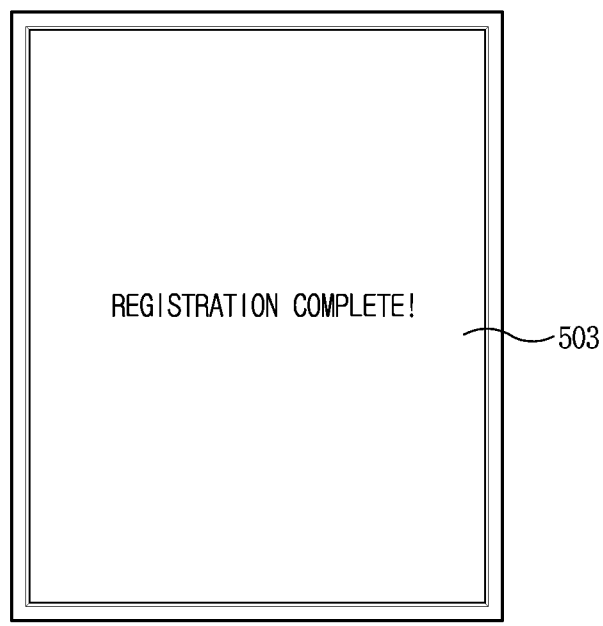

FIGS. 5A, 5B, and 5C show a specific example process of registering user information including a face image in association with a desired shopping mall.

First, when a first input is received by the refrigerator, the refrigerator enters a user information registration mode. When the entry into the user information registration mode is detected, the control unit performs network communication and displays first screen information for selecting a face image to be registered as user information.

FIG. 5A shows an example of the first screen information. One or more icons (e.g., a mailbox icon, a cloud icon, etc.) for calling a face image of a user is displayed as first screen information 501 shown in FIG. 5A. When a touch input is applied to a displayed specific icon, the control unit may access a corresponding server through network communication and select and call a desired face image.

Also, although not shown, when a capture icon is displayed and selected, an image of a user's face may be captured through a camera of the refrigerator and then used as registration information.

When a second input for selecting a face image to be registered using the first screen information 501, second screen information for selecting a shopping mall to be associated with the face image selected using the first screen information 501 is displayed.

FIG. 5B shows an example of the second screen information. One or more shopping mall icons are displayed as second screen information 502 shown in FIG. 5B. When a touch input is applied to a displayed specific shopping mall icon, the face image selected using the first screen information 501 and connection information of the shopping mall to which the touch input is applied are registered in association with each other as user information.

When the shopping mall to be associated with the face image is selected, third screen information 503 for issuing a notification that the registration of the user information is complete is displayed on a display of the refrigerator.

Different methods of recognizing a user depending on the location of the camera provided in the refrigerator will be described in detail below. First, FIGS. 6A, 6B, and 6C are related to a method of recognizing a user using a camera provided on an inner side with respect to a door.

Figure 6A:
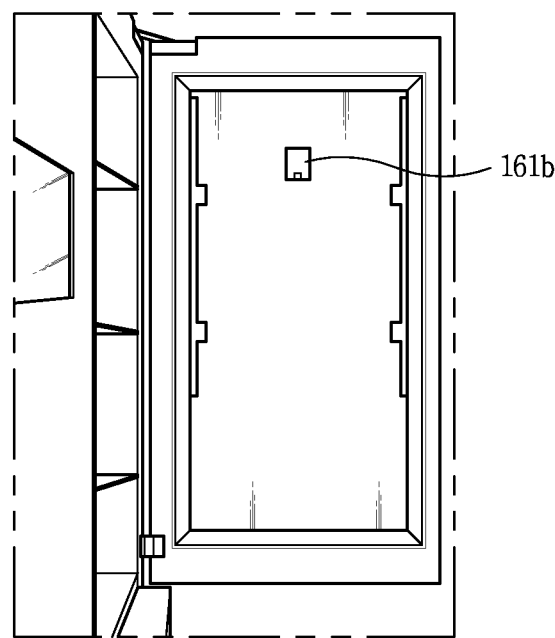
FIGS. 6A, 6B, and 6C are conceptual diagrams illustrating that a user is recognized using a camera provided on an inner side with respect to the door of a refrigerator according to an embodiment of the present invention.
Figure 6B:
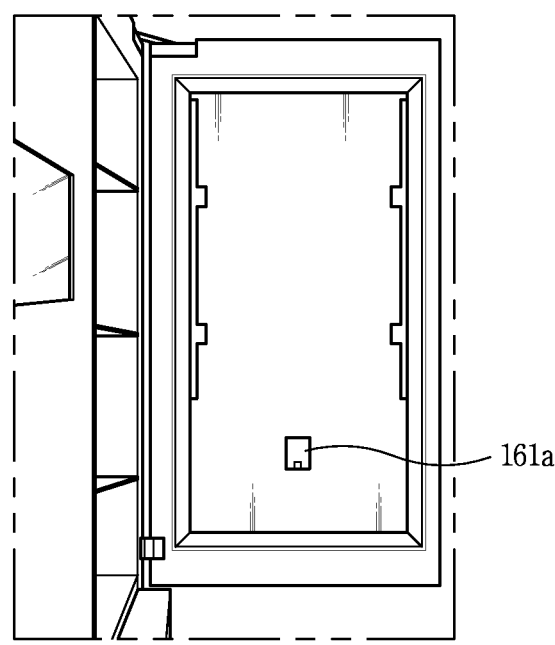
Figure 6C:
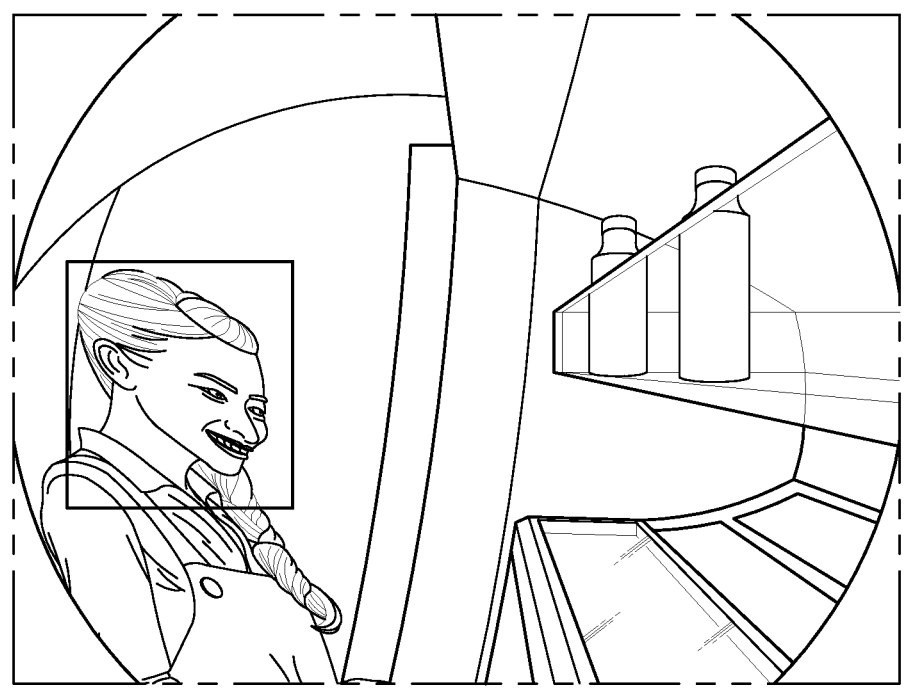

According to the present invention, a camera 161 a for recognizing a user's face may be provided on an inner side with respect to the refrigerator door, as shown in FIG. 6A or 6B. In detail, when it is assumed that the door is opened, the camera 161 a may be provided on at least one of an inner upper side (FIG. 6A) or an inner lower side (FIG. 6B). In this case, only when the refrigerator door is opened beyond a certain range, the camera 161 a may capture an image of a user's face as shown in FIG. 6C.

Thus, the control unit of the refrigerator according to the present invention may output a capture command for capturing an image of the user's face to the camera 161 a (see FIGS. 6A and 6B) in response to detecting that a hinge unit provided on one side of the refrigerator door is rotated over a certain range after the door is opened.

To this end, a sensor for detecting the degree of rotation of the door may be provided in the hinge unit provided on one side of the door. When the hinge is so rotated that the refrigerator door is opened beyond a certain range (e.g., 90 degrees), the corresponding sensor may deliver a corresponding signal to the control unit to enable the camera to be driven.

Figure 6D:
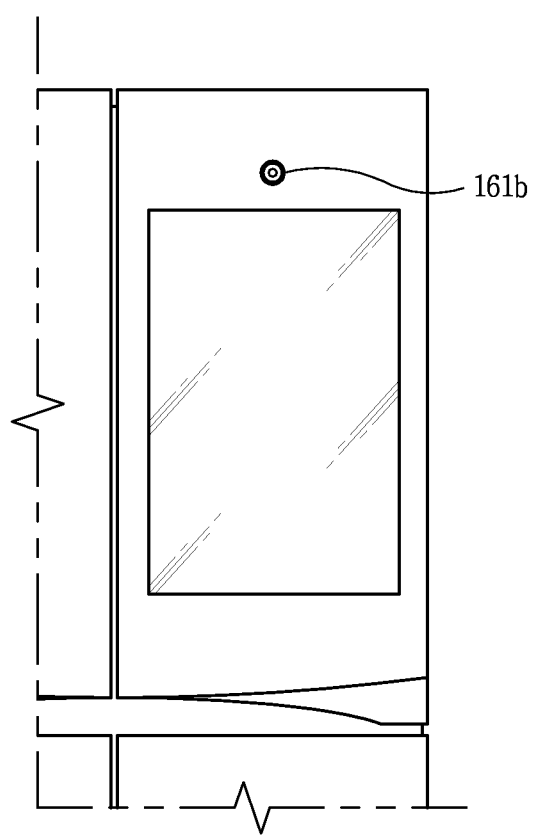
FIGS. 6D and 6E are conceptual diagrams illustrating that a user is recognized using a camera provided on an outer side with respect to the door of a refrigerator according to an embodiment of the present invention.
Figure 6E:
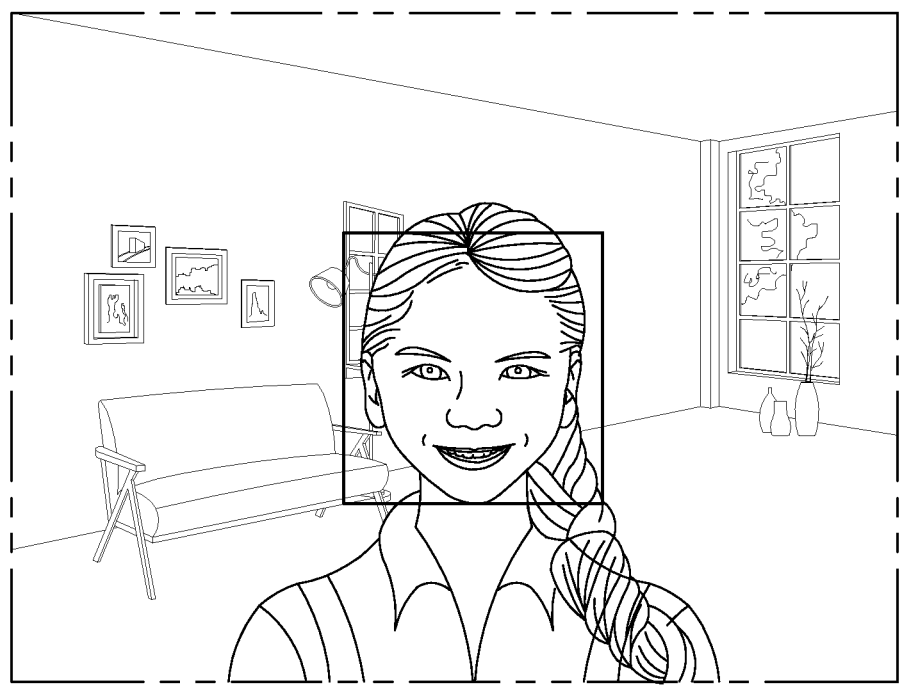

As another example, according to the present invention, a camera 161b for recognizing a user's face may be provided on an outer side with respect to the refrigerator door, for example, on the front top of the door, as shown in FIG. 6D. In this case, a face image may be captured as shown in FIG. 6E although the door is not open. However, the capturing may be performed at least when a user is located in front of the door.

Thus, when the user approaching the refrigerator is detected and a door opening signal is received, the control unit of the refrigerator may output a capture command for capturing the face image of the user to the camera. Here, the door opening signal may refer to a signal delivered through a contact sensor provided the door's handle or the above-described door opening/closing detection sensor.

A detailed process of providing a list of recommended purchase products to a specific person will be described below on the basis of a product use history of a recognized user with reference to FIGS. 7A, 7B, and 7C.

First, when a touch input is applied to the display, the control unit of the refrigerator may output identification information of the recognized user on the basis of the face image acquired through the camera. For example, as shown in FIG. 7A, when the user applies a knock-on touch to the display of the refrigerator, an image of the user is captured through the camera provided on the front of the door. Also, the control unit detects a face region from the captured image and recognizes the user through a user classifier created through learning. Thus, as identification information of the recognized user, for example, a voice such as "Hello, Mr. Customer" may be output. However, the present invention is not limited thereto, and the identification information of the user may be displayed through the display of the refrigerator although not shown.

When the identification information of the recognized user is output, a graphic object for providing recommended purchase products is output to the display. For example, as shown in FIG. 7B, a "recommend food and add to cart" icon is output as the graphic object 702.

Figure 7A:
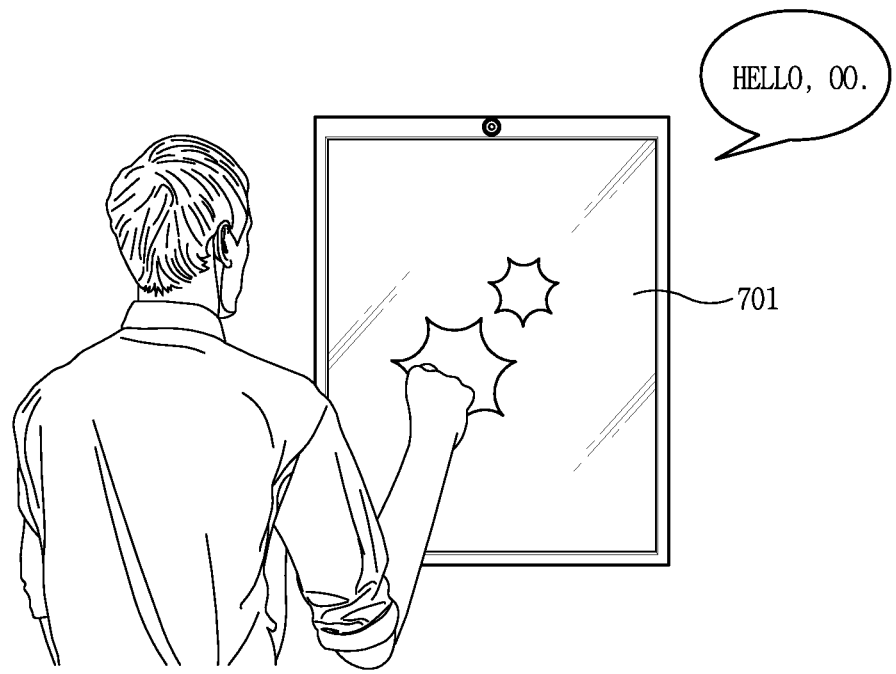
FIGS. 7A, 7B, and 7C are conceptual diagrams illustrating a specific example in which a list of recommended purchase products is provided on the basis of a product use history of a recognized user in a refrigerator according to an embodiment of the present invention.
Figure 7B:
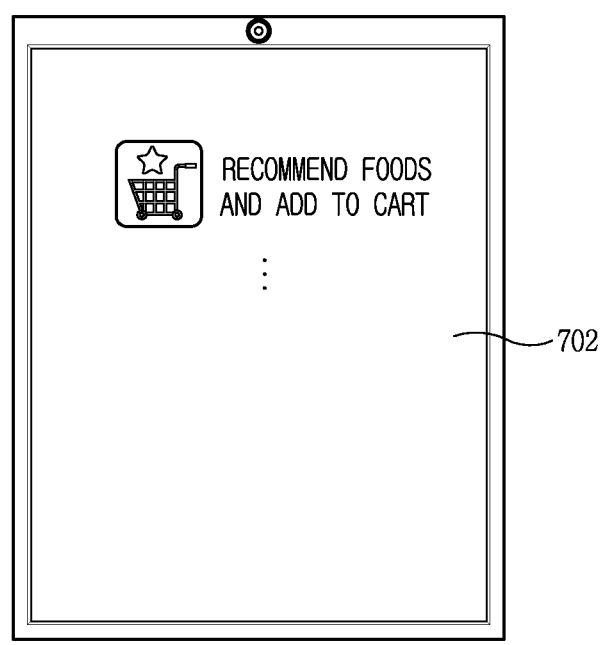

When the user touches the corresponding graphic object 702, the control unit detects a product use history of the recognized user and displays a list of recommended purchase products on the basis of the detected product use history, as shown in FIG. 7A.

Figure 7C:
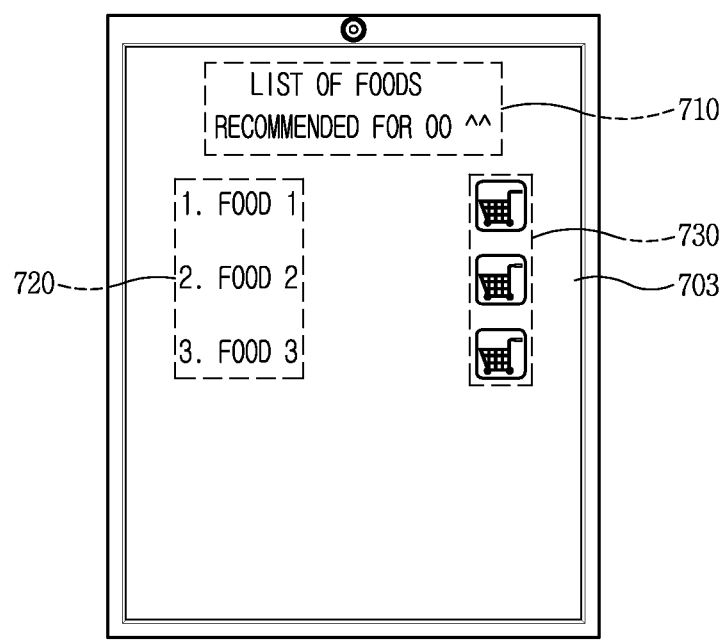

FIG. 7C shows an example screen 703 on which the list of the recommended purchase products for the recognized user is displayed. Recognized user information 710, output product information 720 classified using a product name, and cart icons 730 may be output to the shown screen 703. Each cart icon 730 includes connection information for accessing a shopping mall associated with the recognized user information 710. When a touch is applied to any one of the displayed cart icons 730, a matched product is automatically added to a cart of the associated shopping mall. That is, an "add to cart" function is executed for a corresponding recommended purchase product.

Also, although not shown, a purchase button may be created in one region of the screen 703, for example, on a lower portion of the screen 703 when a touch is applied to any one of the displayed cart icons 730. When the user touches the cart icon 730 matched to the product to be purchased and then pushes the purchase button, the desired product may be instantly purchased through the desired shopping mall.

Figure 8:
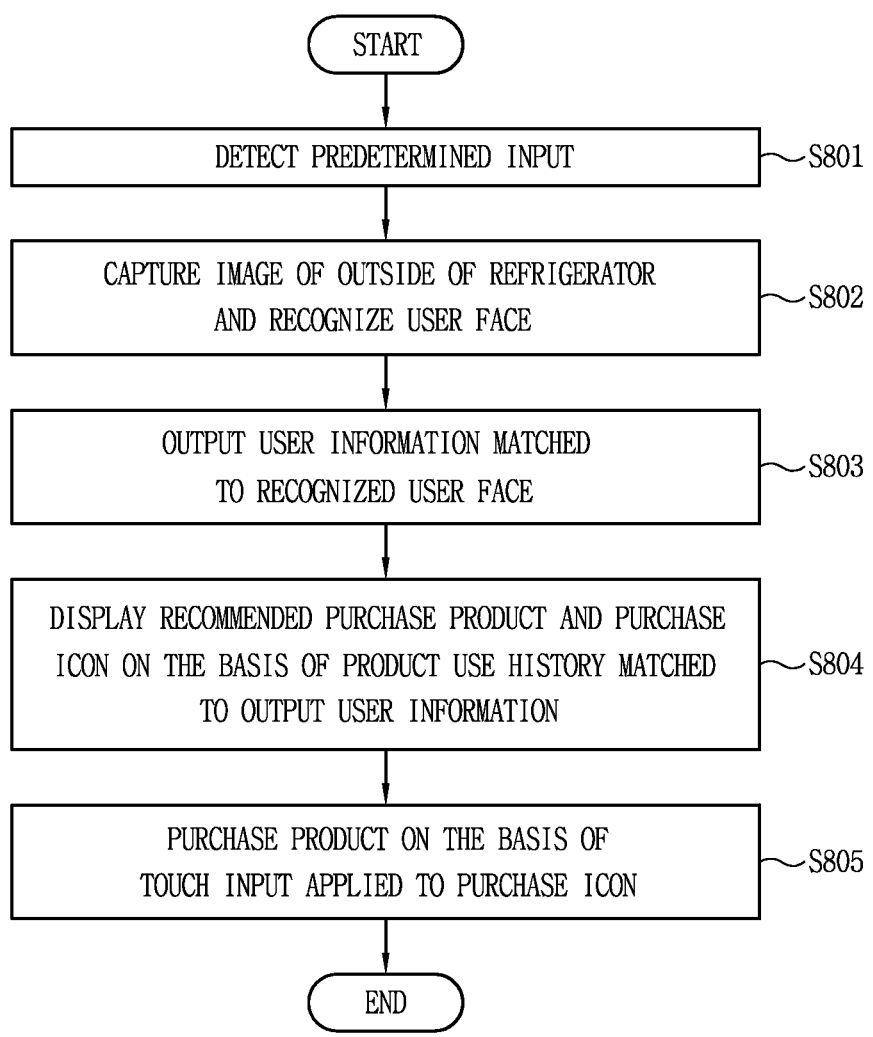
FIG. 8 is an example flowchart illustrating a method of purchasing a product on the basis of a product use history matched to user information in a refrigerator according to an embodiment of the present invention.

FIG. 8 is an example flowchart illustrating a method of purchasing a product on the basis of a product use history matched to user information in a refrigerator according to an embodiment of the present invention.

Referring to FIG. 8, the control unit of the refrigerator according to the present invention detects that a predetermined input is received (S801) and then captures an image of the outside of the refrigerator and recognizes a user's face (S802). Subsequently, the control unit outputs user information matched to the recognized user face, for example, a pre-registered photo image or a user name to the display of the refrigerator (S803).

At the same time or sequentially, a recommended purchase product and a purchase icon are displayed on the basis of a product use history matched to the user information (S804). In this case, a list of the recommended purchase products may be sorted in sequence on the basis of a product use frequency corresponding to a product use history of the corresponding user. As another example, the list of the recommended purchase products may be sorted according to an expected purchase date estimated on the basis of a purchase time (in the order of purchase) and a purchase history.

After at least some of the displayed recommended purchase products are selected, all or some of the recommended purchase products are instantly purchased on the basis of a touch input applied to a displayed purchase icon (S805). Accordingly, the convenience and usability of the management and purchase of favorite products for each user may be further improved.

Figure 9A:
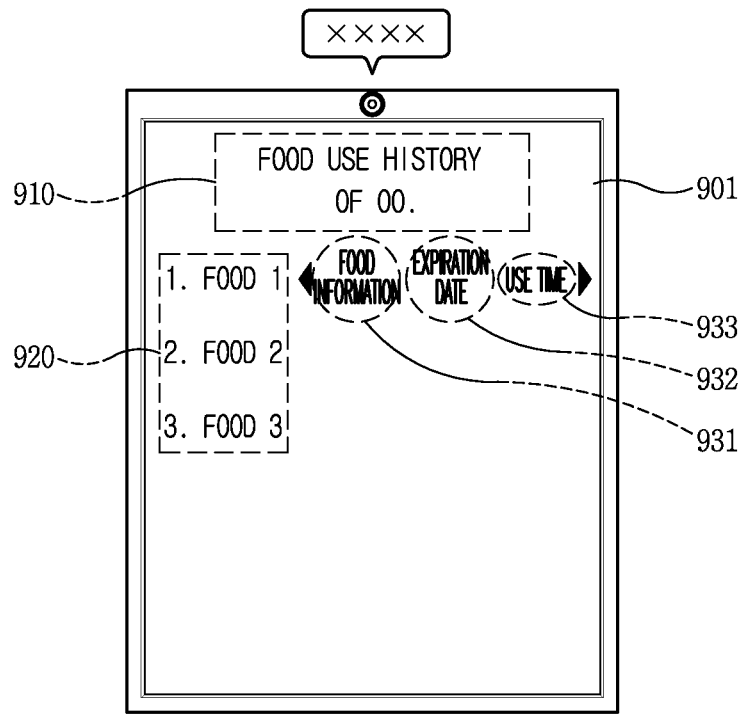
FIG. 9A shows an example in which additional information is provided to a list of recommended purchase products for each user in a refrigerator according to an embodiment of the present invention.
Figure 9B:
FIG. 9B shows an example in which notification information for encouraging the purchase of a specific product when a user is approaching.

Meanwhile, FIG. 9A shows an example of additional information provided to a user-specific recommended purchase product list, and FIG. 9B shows an example in which notification information for encouraging the purchase of a specific product when a user is approaching.

As an example, at least some of food information, expiration date information, and output time information of the output product acquired through the visual recognition may be included in the list of recommended purchase products that is output based on a product use history detected according to recognized user information.

For example, referring to FIG. 9A, recognized user information 910, a product name 920 of a recommended purchase product, and additional information for each product, for example, food information 931, expiration data 932, and use time information 933 may be further displayed in a displayed screen 901.

The food information 931 may include information such as an image, a product name, calorie, and the like of Food 1. The expiration date information 932 may include expiration date information of Food 1 acquired through the visual recognition or storage period information based on when Food 1 is first stored in the refrigerator. Also, the use time information 933 may include time information and the number of outputs of Food 1.

As another example, a face image of a user approaching the refrigerator may be captured, and notification information for encouraging the purchase of a product may be output to the display on the basis of a product use history of the user matched to the captured face image.

For example, referring to FIG. 9B, in response to detecting the proximity of a user through a sensor for detecting user proximity, a notification for encouraging the purchase of a product of which expiration date is coming soon, which is found out on the basis of the product use history, for example, Food 2 may be output to a screen 902 displayed on the display together with the user information 910. Thus, the user does not miss a product necessary to be purchased, and thus it is possible to improve the user's purchasing power.

Also, although not shown, in response to detecting the proximity of the user through the sensor for detecting user proximity, a product use history of the user recognized through capturing may be detected, and sale information, advertisement information, limited sales information, and the like of a recommended purchase product provided by an associated shopping mall may be output to the display. Thus, it is possible to provide customized advertising effects and purchasing effects.

As described above, according to the present invention, by checking a product use history of a user when the user is approaching the refrigerator and outputting notification information for encouraging the purchase of a product necessary to be purchased or useful information such as sale information, the user does not miss the product necessary to be purchased, and thus it is possible to improve the user's purchasing power.

Figure 10A:
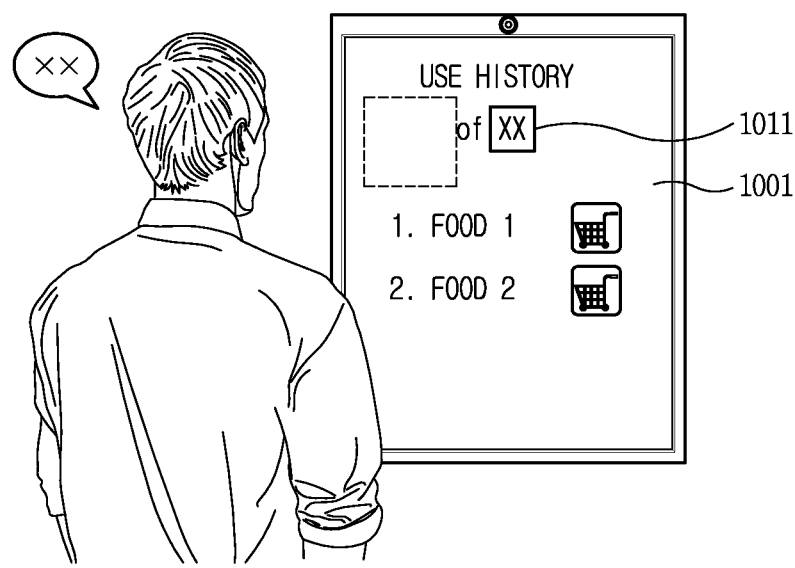
FIGS. 10A and 10B are diagrams illustrating that another user is added to a displayed list of recommended purchase products in a refrigerator according to an embodiment of the present invention.
Figure 10B:
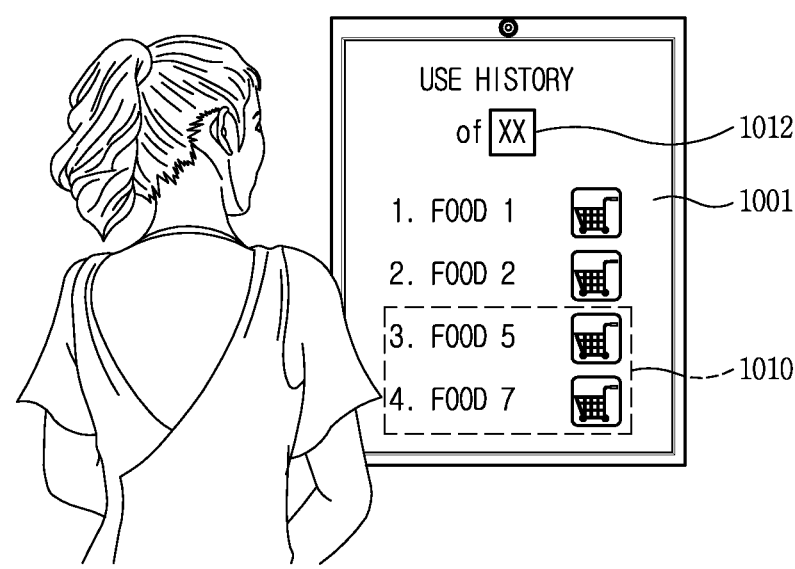

Subsequently, FIGS. 10A and 10B show an example in which another user is added to a displayed list of recommended purchase products.

First, referring to FIG. 10A, the control unit of the refrigerator displays a list 1001 of recommended purchase products for a first user 1011 on the display. In this state, another user's favorite products may be added to the list on the basis of a touch input applied to the display, for example, a touch input applied to a region where user information is output.

For example, when the user information is changed to a second user 1012 on the basis of the touch input as shown in FIG. 10B, a recommended purchaser product 1010 for the second user 1012 may be added to the displayed list 1001. Thus, one person may order another person's favorite product.

Figure 11:
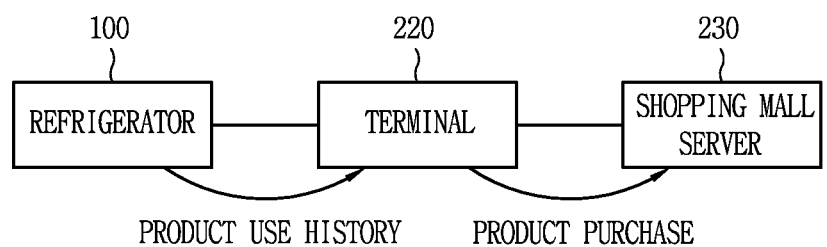
FIG. 11 is a diagram illustrating that a refrigerator delivers a created product use history to an external terminal so that a shopping mall is accessed through the external terminal according to an embodiment of the present invention.

Subsequently, FIG. 11 is a diagram illustrating that a refrigerator delivers a created product use history to an external terminal so that a shopping mall is accessed through the external terminal.

Referring to FIG. 11, the refrigerator 100 according to the present invention provides a product use history to the external terminal 220 through network communication. In this case, the provided product use history may be limited to a product use history matched to a user of the external terminal 220.

When the product use history is received from the refrigerator 100, the external terminal 220 may automatically access a pre-associated online shopping mall. After the automatic access, a purchase page rather than the main page of the screen of the accessed shopping mall may be displayed on the screen of the external terminal 220. Also, in the displayed purchase page, a purchaser product recommended on the basis of the product use history received from the refrigerator 100 may be added to a cart. That is, an "add to cart" function may be automatically executed for the recommended purchase product. The user may quickly purchase a favorite product based on a product output from the refrigerator through the terminal 220 even in a remote location.

As described above, according to an embodiment of the present invention, by capturing images of a user's face and an output product when the product is output from a refrigerator, it is possible to accurately manage the history of the output product on a user basis. Also, by pre-associating user information matched to a user's face with a favorite shopping mall when the user information is registered, it is possible to recommend a purchase product and instantly purchase the recommended product on the basis of a user-specific product use history. Accordingly, the usability of the management and purchase of favorite products for each user may be further improved. Furthermore, by checking a use history of a user approaching a refrigerator when the user is recognized and outputting notification information for encouraging the purchase of a product necessary to be purchased, the user does not miss the product necessary to be purchased, and thus it is possible to improve the user's purchasing power.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 250. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A refrigerator comprising:
a storage chamber;
a camera configured to capture images of an outside and an inside of the storage chamber;
a memory configured to store user information corresponding to a user image for a user and one or more vendors associated with the user;
a processor configured to determine when one of the captured images corresponds to the user image, to identify a product included in one of the captured images, and to acquire product information associated with the identified product when a refrigerator door to access the storage chamber is opened or closed; and
a display,
wherein the processor further:
associates information related to the opening or closing of the refrigerator door, the product information, and the user information as a product use history, and
controls the display to present a purchase recommendation list determined based on the product use history together with connection information for an associated one of the vendors in response to receiving a prescribed user input,
wherein the purchase recommendation list comprises a first icon for indicating a recommend food and a second icon for indicating object add to cart for the recommend food,
wherein the second icon includes connection information for accessing a shopping store associated with the user information, and
wherein the connection information is configured to connect to a first shopping store for the product when the user information corresponds to a first person's user information, and to connect to a second shopping store for the same product when the user information corresponds to a second person's user information,
wherein the processor is configured to:
analyze a first image captured by a camera to identify a first user based on matched user information,
display the purchase recommendation list associated with the first user that includes the first icon for indicating a first specific food and the second icon for indicating object add to cart for the first specific food, and
based on the selection of the second icon from the purchase recommendation list associated with the first user, purchase the first specific food at the first shopping store, and
wherein the processor is configured to:
analyze a second image captured by the camera to identify a second user based on matched user information,
display the purchase recommendation list associated with the second user that includes the first icon for indicating the first specific food and the second icon for indicating object add to cart for the first specific food, and
based on the selection of the second icon from the purchase recommendation list associated with the second user, purchase the first specific food at the second shopping store.

2. The refrigerator of claim 1, wherein,
when a first input associated with a user information registration mode is received, the processor controls the display to present first screen information related to selecting an image to be registered as user information through network communication, and
when a second input for selecting the image to be registered using the first screen information is received, the processor controls the display to present second screen information for selecting a vendor to be associated with the selected image.

3. The refrigerator of claim 1, wherein when an input to select the second icon is received, the processor executes an "add to cart" function for a corresponding recommended purchase product and controls the display to output a purchase graphical object for paying for the corresponding recommended purchase product.

4. The refrigerator of claim 1, wherein the purchase recommendation list is sorted based on a product use frequency corresponding to a product use history of a corresponding user.

5. The refrigerator of claim 1, wherein at least one of food information, expiration date information, or output time information of the identified product is included in the purchase recommendation list.

6. The refrigerator of claim 1, further comprising a sensor configured to detect user proximity,
wherein in response to detecting a proximity of a user, the processor controls the camera to capture a face image of the user and controls the display to output notification information related to a product purchase based on a product use history of the user matched to the captured face image.

7. The refrigerator of claim 1, wherein while the purchase recommendation list for a first user is displayed, the processor controls the display to modify the purchase recommendation list to include a recommended purchase product for a second user based on receiving a prescribed input.

8. The refrigerator of claim 1, wherein,
the camera includes a first camera that captures images of the outside of the storage chamber and a second camera that captures images of the inside of the storage chamber, and
the processor analyzes an image captured through the first camera to identify matched user information and analyzes an image captured through the second camera to acquire the product information.

9. The refrigerator of claim 8, wherein when an opening of the refrigerator door is detected, the processor captures a face image of a person through the first camera to detect a face region and analyzes data of the detected face region based on a model generated according to an artificial intelligence algorithm to classify the person.

10. The refrigerator of claim 8, wherein when an opening of the refrigerator door is detected, the processor extracts feature points from a product image captured through the second camera and performs visual recognition based on the extracted feature points to classify the product.

11. The refrigerator of claim 8, wherein,
the first camera is located at an interior of the refrigerator with respect to the refrigerator door, and
the processor outputs a command for the first camera to capture an image of a user in response to determining that a hinge provided on a side of the refrigerator door is rotated at least a prescribed angular distance after the refrigerator door is opened.

12. The refrigerator of claim 8, wherein,
the first camera is located on an exterior of the refrigerator with respect to the refrigerator door, and
the processor outputs a command for the first camera to capture an image of a user in response to determining that the user approached the refrigerator door and determining that the refrigerator door has been opened.

13. The refrigerator of claim 12, wherein when a touch input is applied to the display, the processor controls the display to output identification information of the user recognized based on the image acquired through the first camera and to output a graphic object related to providing a purchase recommendation in connection with outputting the identification information.

14. A method of managing products in a refrigerator, the method comprising:
registering user information and associating a user image with one or more vendors;
capturing an image of an outside of the refrigerator through a first camera after a refrigerator door is opened and recognizing a user included in the captured image of the outside based on the user image;
capturing an image of an inside of a storage chamber of the refrigerator through a second camera while the refrigerator door is closed after the opening of the refrigerator door, and acquiring product information related to a product included in the captured image of the inside;
storing the acquired product information and information identifying the user as a product use history; and
displaying a purchase recommendation list together with information identifying one of the vendors based on the product use history,
wherein the purchase recommendation list comprises a first icon for indicating a recommend food and a second icon for indicating object add to cart for the recommend food,
wherein the second icon includes connection information for accessing a shopping store associated with the user information, and
wherein the connection information is configured to connect to a first shopping store for the product when the user information corresponds to a first person's user information, and to connect to a second shopping store for the same product when the user information corresponds to a second person's user information,
wherein the method comprises:
analyze a first image captured by a camera to identify a first user based on matched user information,
display the purchase recommendation list associated with the first user that includes the first icon for indicating a first specific food and the second icon for indicating object add to cart for the first specific food, and
based on the selection of the second icon from the purchase recommendation list associated with the first user, purchase the first specific food at the first shopping store, and
wherein the method comprises:
analyze a second image captured by the camera to identify a second user based on matched user information,
display the purchase recommendation list associated with the second user that includes the first icon for indicating the first specific food and the second icon for indicating object add to cart for the first specific food, and
based on the selection of the second icon from the purchase recommendation list associated with the second user, purchase the first specific food at the second shopping store.

15. The method of claim 14, wherein the purchase recommendation list and the information identifying the associated one of the vendors are displayed based on receiving a prescribed user input.

16. The method of claim 14, wherein the user image includes a face image, and recognizing the user includes comparing a detected face region in the image captured by the first camera to the face image.

17. The method of claim 14, wherein acquiring the product information related to the product included in the captured image of the inside includes extracting feature points from the image, and performing visual recognition based on the extracted feature points to classify the product.

18. The method of claim 14, wherein the purchase recommendation list is sorted based on an expected purchase date estimated on the basis of a purchase time and a purchase history of a corresponding user.

19. The method of claim 14, wherein the user information associates each of a plurality of user with one or more vendors, and displaying the information identifying the one of the vendors includes identifying one of the vendors associated with the identified user.

\* \* \* \* \*